UNITED STATES PATENT OFFICE.

JOKICHI TAKAMINE, OF NEW YORK, N. Y.

AMYLOLYTIC ENZYM.

991,561.  Specification of Letters Patent.  Patented May 9, 1911.

No Drawing.  Application filed January 25, 1907. Serial No. 353,973.

*To all whom it may concern:*

Be it known that I, JOKICHI TAKAMINE, a subject of the Emperor of Japan, and residing in the city, county, and State of New York, have made a certain new and useful Invention in Amylolytic Enzyms, of which the following is a specification.

My invention relates to diastatic substances, or enzyms, possessing the property of converting starch into sugar.

The object of my invention is to provide a new and improved amylolytic enzym, and process of making the same.

A further object of my invention is to produce a new diastatic substance possessing the double function of liquefying and saccharifying starch so that the starch may be liquefied by the liquefying property of the diastatic agent, and the liquefied starch saccharified by the saccharifying property of the diastatic agent.

The invention consists substantially in the mode of operation, all as will be more fully hereinafter set forth and finally pointed out in the appended claims.

It it well known that amylolytic enzyms, or diastatic enzyms in general, possess the property of effecting a conversion of starch into sugars. In effecting the conversion of starch into sugars various stages or steps of the conversion, each distinctive in itself, are involved. In the first place, the starch is required to be liquefied or dissolved. Next, the liquefied or dissolved starch is transformed into dextrin. This, however, is a mere transition stage in the converting operation and for the purposes of my present invention may be left out of further consideration. The final stage in the converting process is the saccharifying stage, in which the dextrins are transformed into sugars. I have discovered that these separate and distinct stages in starch conversion, or at least the liquefying and saccharifying stages, are effected by distinct converting agents, and that whereas these agents may all be present in a diastatic enzym, they do not occur therein in the most advantageous or desirable proportions for effecting the most economic conversion of the starch into sugar.

In my Patents Nos. 525,820, 525,823, and 525,824, all dated September 11, 1894, I have set forth, described and claimed a diastatic agent, and method of producing the same, by propagating a fungus upon a suitable culture medium employed as a soil, and which in the particular instance referred to, is described as being the branny parts or portions of grains or cereals, which medium is moistened with water, and serves as a soil upon which the seed spores of the desired or required fungus are sown, either with or without, before or after, steaming the culture medium to sterilize the same, and then the soil with the fungus seeds sown thereon is maintained under proper conditions of temperature and humidity, to allow the fungus to develop and grow abundantly until a desired stage of development is attained, when the growth of the fungus is arrested, and the soluble constituent of the mass extracted with water in order to separate and recover from the mass the diastatic properties contained therein. This extract may be employed directly as a starch converting agent, or it may be concentrated in various ways, as by evaporation, or by being used over and over again as an extracting agent for fresh quantities of the mass upon which the fungus has been grown, or the active diastatic principle may be precipitated from the extract, and recovered and used in solid or powdered form wherever the use of a diastatic or starch converting agent is desired.

The diastatic agent thus prepared, whether in the form of the original mass, the extract, or the isolated solid or powdered form, possesses the power of converting starch into sugar, and I have called this agent "koji", koji extract, taka-koji, and taka-diastase, and while possessing the power of converting starch into sugar, it does not possess in proper or desirable degree the saccharifying property above referred to, it does possess however in a most remarkable manner the liquefying property above mentioned. The culture medium upon which the fungus is grown in the production of koji, taka-koji, or taka-diastase, and especially where such medium is composed of brans, shorts, middlings, or other branny portions of grains or cereals, appears to contain a natural proferment or zymogen, which, when transformed into active form, possesses diastatic property, and when so transformed, this agent or principle contains an intensified saccharifying property. In accordance with my invention, therefore, I propose to effect a transformation of the pro-ferment or zymogen of the raw brans or other cereals employed for the nutrient medium in the production of taka-diastase, and to separate, recover or extract such transformed pro-ferment or zymogen along with the taka-diastase, thereby securing an extract or a converting agent which combines within itself the properties of liquefying and then saccharifying starch, in effecting a complete conversion of the starch into sugar. Hence while taka-diastase by itself possesses to some degree a saccharifying power, but not to as great extent as it possesses liquefying power, that is, these characteristics are not present in taka-diastase in such relative proportions as to effect a complete economic conversion of starch into sugar, by transforming the pro-ferment of the culture medium into active form, and extracting such transformed pro-ferment along with the taka-diastase, an extract is produced which does contain both liquefying and also saccharifying characteristics or properties in the desired proportions to effect the complete conversion of the starch into sugar.

While I do not desire to be limited or restricted in this respect, I employ the word "bran" to include middlings and shorts of grain or cereals.

The pro-ferment or zymogen of the culture medium may be transformed into active form, possessing saccharifying properties—a property which it does not have until transformed, in many specifically different ways. In one maner of effecting this result, I employ a suitable acid to effect such transformation, and without desiring to be limited or restricted thereto, I have found that sulfuric acid, $H_2SO_4$, and also that phosphoric acid $H_3PO_4$, are suitable for the purpose. The acid is added to the raw brans, or other culture medium, after such brans or the like have been moistened with water, and then the spores of the fungus are sown upon the acidulated culture medium. The acid may be added to the soil in any suitable or desirable proportion.

While I do not desire to be limited or restricted to any specific proportions, I have found that from .3 per cent. to .5 per cent. by weight of the acid, added to the raw soil, is satisfactory. After the spores of the fungus are sown upon the acidulated soil, the mass is maintained under suitable conditions of temperature and humidity, to permit the fungus to develop and grow to the desired stage, and the subsequent manipulation thereof for arresting the growth at the desired stage, and of extracting or recovering the diastatic principle, remains the same as set forth, described and claimed in my former patents above referred to.

I have found that a temperature of from 28° C., to 30° C., and a state of humidity carried to the point of saturation, will well answer the purposes of my invention, but I do not desire to be limited in these respects as variations therefrom may be readily made without departure from the scope of my invention, and the temperature may be varied according to the variations in atmospheric temperatures.

In the operation of extracting and recovering the diastatic substances of the mass by treating such mass with water, the acid employed for acidulating the nutrient medium, or such of the soluble part thereof that remains in the mass, is extracted along with the diastase and other soluble substances. When, however, the diastase is precipitated with alcohol from the solution the acid remains in the solution and is not precipitated and hence the diastatic product is recovered entirely free from the acid.

The presence of the acid in the mass of the soil effects the transformation of the pro-ferment or zymogen contained in the raw soil into active form, which possesses saccharifying properties, and which is extracted from the mass along with the taka-diastase, thereby producing an extract which contains the agents in the desired relative proportions for first liquefying, and then saccharifying the starch in effecting the complete conversion of the starch into sugar.

I have found that the addition of the acid not only transforms the pro-ferment into active form, but also that by the addition of acid, as above set forth, the yield of diastase precipitate obtained from the extract when alcohol is added thereto to effect the precipitation of the solid matters contained therein, is very greatly increased. I have discovered that this increase in quantity of yield of diastase, as well as the increase in the diastatic strength thereof, is due to the fact that the presence of the acid induces the formation of a soluble phosphate from the insoluble phosphate present in the raw brans or other materials employed as a nutrient medium, and the presence of a soluble phosphate in the nutrient medium in a form which is more readily absorbed by, or assimilated by the growing fungus, increases the yield of diastase recovered from the mass, when precipitated from a water extract of the mass, and, further, that the transformation of the pro-ferment or zymogen also increases the strength of the final product in diastatic property.

As above indicated, the mixture of amylolytic enzyms possessing the double characteristic or function of liquefying and saccharifying starch, may be used in the form of an extract, or such enzyms may be precipitated from the extract with alcohol, or otherwise recovered and used in dry or powdered form.

Having now set forth the object and nature of my invention, and the method of producing the same, what I claim as new and useful and of my own invention, and desire to secure by Letters Patent is—

1. The process of producing a starch saccharifying agent which consists in acidulating bran with phosphoric acid, thereby transforming the pro-ferment of the bran, and then making an aqueous extract of the bran while still in an acidulated condition.

2. The process of producing a starch saccharifying agent which consists in acidulating bran with a mineral acid thereby transforming the pro-ferment of the bran, and then making an aqueous infusion of the bran while still in an acidulated condition.

3. The process of producing a starch liquefying and saccharifying agent which consists in mixing mineral acid with bran to transforming the pro-ferment of the bran, active form, and then developing a fungus growth upon the mass while in the acidulated state.

4. The process of producing a starch liquefying and saccharifying agent which consists in mixing mineral acid with bran to transform the pro-ferment of the bran into active form, then developing a fungus growth upon the mass while in the acidulated state, and finally separating from the acidulated mass the soluble constituents thereof.

5. The process of producing a starch liquefying and saccharifying agent which consists in acidulating bran with phosphoric acid to transform the pro-ferment of the bran, then developing a fungus growth upon the mass while in an acidulated state, and finally extracting the soluble constituents of the acidulated mass with water.

6. As a new article of manufacture, an extract containing the transformed pro-ferment of brans having greater power of saccharifying starch than the pro-ferment naturally present in the brans.

In testimony whereof I have signed my name to this specification, in the presence of two subscribing witnesses, on this 21st day of January, A. D. 1907.

JOKICHI TAKAMINE.

Witnesses:
 KEIZA WOOYENAKE,
 S. E. DARBY.